Feb. 10, 1925.

A. C. TAYLOR 1,525,626

ELECTRICAL WELDING MACHINE

Filed Sept. 15, 1923     5 Sheets-Sheet 3

INVENTOR
A·C·TAYLOR
Attorneys

Feb. 10, 1925.

A. C. TAYLOR 1,525,626

ELECTRICAL WELDING MACHINE

Filed Sept. 15, 1923    5 Sheets-Sheet 4

INVENTOR.
A. C. TAYLOR
By
Attorneys

Feb. 10, 1925.

A. C. TAYLOR 1,525,626

ELECTRICAL WELDING MACHINE

Filed Sept. 15, 1923    5 Sheets-Sheet 5

Patented Feb. 10, 1925.

1,525,626

UNITED STATES PATENT OFFICE.

ALBERTIS C. TAYLOR, OF WARREN, OHIO.

ELECTRICAL WELDING MACHINE.

Application filed September 15, 1923. Serial No. 662,795.

*To all whom it may concern:*

Be it known that I, ALBERTIS C. TAYLOR, a citizen of the United States, residing at Warren, in the county of Trumbull and State of Ohio, have invented certain new and useful Improvements in Electrical Welding Machines, of which the following is a specification.

This invention relates to an improvement in electric welding machines, and in general the object of the invention is to provide an electric welding machine in which a set of welding dies are supported in an inclined plane to permit the work to be easily placed in position and removed and also readily observed by the operator and the operating parts made conveniently accessible; in which a transformer is supported and balanced in an inclined plane at right angles to the welding dies out of the way or remotely from the flash and scattering steel particles and the dropping scale; in which one clamping die is carried on a tilted or inclined slide supported to roll on one edge upon roller bearings to provide a very sensitive upsetting device; in which suitable adjustments may be made and the welding dies set for various sizes of stock to be welded; in which one slide for a work-holding die is suitably supported to permit convenient adjustments to be made to align the dies and pieces of work variably in any desired direction; in which the dies are arranged to permit clamping of large pieces of stock in one die and small pieces of stock in the other die without machining or shimming the dies; in which the bed plate of the machine is reinforced with heavy tie rods to prevent springing of the plate and throwing of the work out of alignment; and in which the slides are faced with hardened steel plates to overcome wear and to maintain proper alignment under the destructive action of fine molten particles thrown off and dropped in electric welding operations.

In the accompanying drawings.

Figure 10:
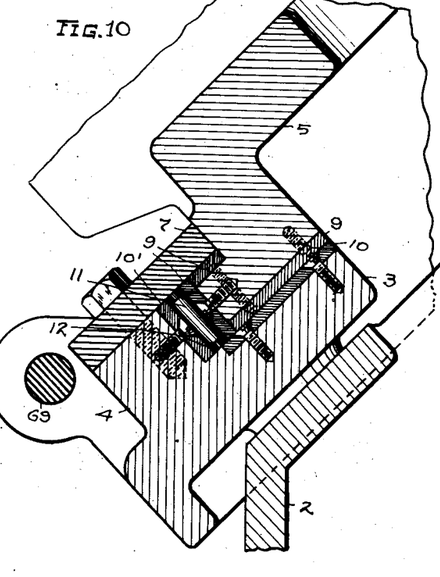
Fig. 10 is an enlarged cross sectional view of the roller bearing arrangement for the movable slide.
Figure 11:
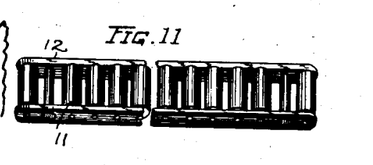
Fig. 11 is a perspective view of the roller bearing device itself, but broken away at its middle and foreshortened.

The machine delineated in the drawings comprises a hollow upright base 2 having an open upper end upon which a heavy bed plate 3 is secured at an inclination of approximately forty-five degrees relatively to the vertical front wall of the machine. Bed plate 3 is open lengthwise at its middle and formed with parallel ribs 4—4 at its longitudinal border edges to provide guiding channels or seats for two rabbeted slides 5 and 6, respectively. These slides are held in place by hardened steel plates 7—7, and slide 5 at the right is freely reciprocable in welding operations, whereas slide 6 at the left is adapted to be clamped in a stationary position upon bed plate 3. However slide 6 may also be moved longitudinally in the channeled seats, but merely for purposes of adjustment. A stationary slide 6 is electrically insulated from bed plate 3 by suitable sheets or linings of electrical insulating material 8 laid within the channeled seats in the bed plate, whereas the rabbeted portions or reciprocable slide 5 are faced with hardened steel plates 9 which contact with and slide upon similar hardened and ground plate 10 and 10' affixed to and lining the channeled seats in the bed plate. Moreover, the reciprocable upsetting slide 5 is supported to roll in an inclined upright position upon a series of hardened steel rollers 11 which are all connected together and journaled in an elongated metal frame 12 to move or roll in unison upon a hardened steel strip 10' removably affixed to rib 4 within the lower channel or seat in bed plate 3, see Figs. 10 and 11.

In practising what is known as the flash welding method with a butt welding machine, the operating parts are subjected to great wear due to the fine particles of molten metal thrown off from the arc at the place of union. That is to say, the liberated fine particles of molten metal cool off and become very hard, and wherever they lodge in the moving parts of the machines they soon grind and cut the bearing surfaces and throw the work out of alignment. This is objectionable as the accuracy of the machine depends largely on the true alignment of the upsetting slides, and any loose play caused by wear is also objectionable because as the weld is upset the upsetting slide has a tendency to raise up, which if permitted, fractures the weld just at the critical moment. I therefore face all the sliding parts with hardened and ground plates 9 and 10 having a greater hardness than the fine particles of metal thrown off in welding operations so that said particles will have no effect on the slides and the slides will last indefinitely. The pin and bushings in the clamping levers and links are also preferably made of similar hardened steel.

In making a flash weld, it is desirable to maintain a constant arc between the parts and to accomplish this result the upsetting slide must travel at a very steady rate of speed. If the slide binds or works hard in any way it is difficult to get the steady movement and arc desired, but by employing roller bearings 11 for the lower edge of the inclined slide the said slide may be reciprocated very freely and controlled very sensitively.

Provision is also made in this machine for adjusting the slides and also the dies relatively to each other to permit the work to be properly placed and aligned, thereby effecting a considerable saving in expense in making the dies which otherwise would have to be machined very accurately; also the dies would wear out of true and require remachining.

Figure 7:
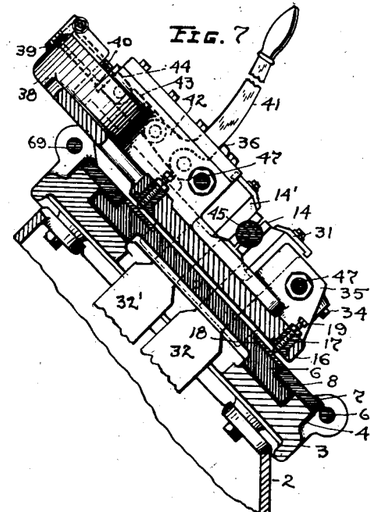
Figs. 7 and 8 are vertical sections of the machine on lines 7—7 and 8—8 respectively of Fig. 5.
Figure 8:
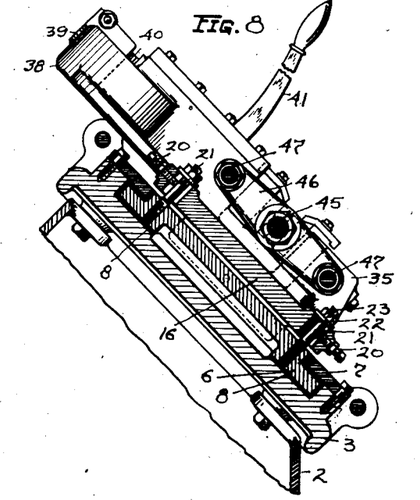
Figure 9:
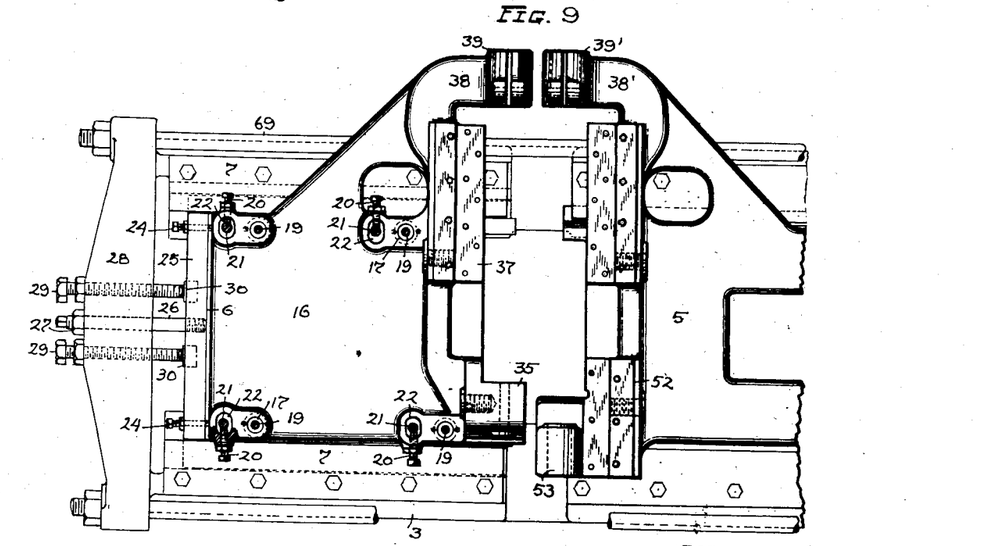
Fig. 9 is a top view of the machine with many of the operating parts removed to more clearly show the means for adjusting one of the slides and parts carried thereon relatively to the other slide.

Thus, separate sets of welding dies 14—14' and 15—15', respectively, are used to hold the separate pieces of work in abutting relation, and alignment of the separate pieces of work is readily accomplished by mounting one set of clamping or welding dies 14—14' and their operating parts upon an independent table 16 which is adapted to be clamped in an adjustable rest position upon the top face of the longitudinally adjustable slide 6. Thus referring to Figs. 7 to 9, inclusive, table 16 is provided with a number of hardened steel bushings 17 opposite hardened steel plates 18 fixed within the top of slide 6, and a set screw 19 extends through each bushing and rests upon a plate 18. As shown four such set-screws 19 are used at or near the four corners of the rectangular slide to enable the table to be raised or lowered relatively to the slide, either uniformly at all the four bearing points or variably to place the table in a tilted position or in a different inclined plane than the slide either longitudinally or transversely.

Figure 5:
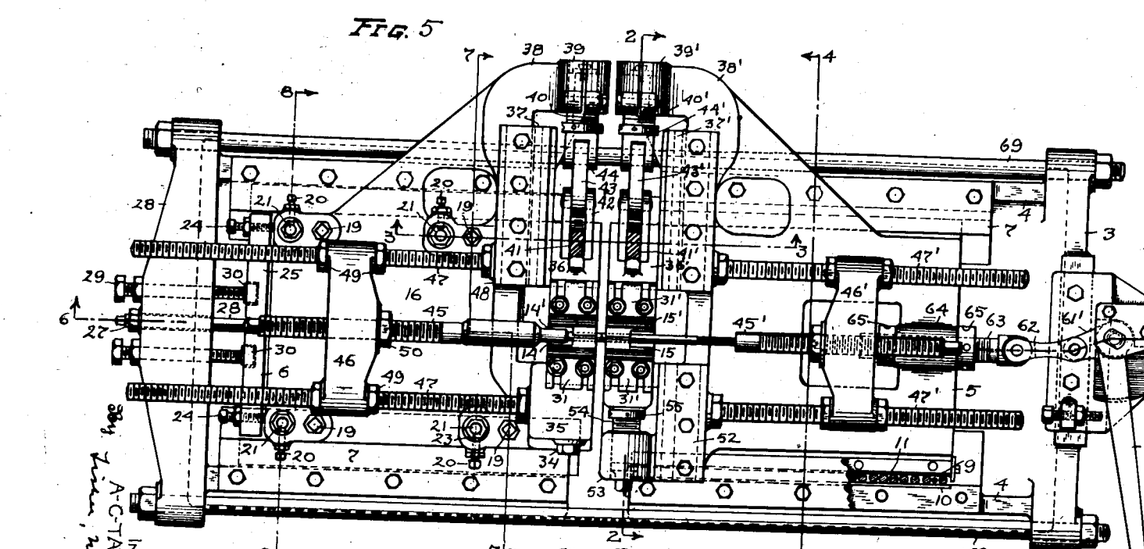
Fig. 5 is a face view of the inclined top portion of the machine on line 5—5 of Fig. 4.
Figure 6:
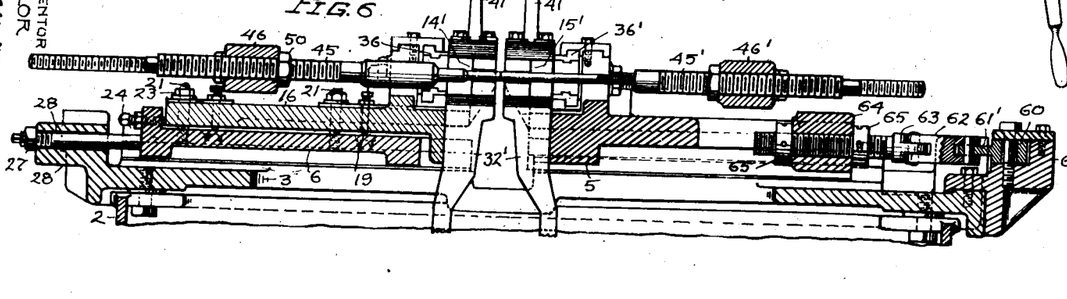
Fig. 6 is a longitudinal section of the top portion of the machine on line 6—6 of Fig. 5.

Table 16 may be adjustably shifted and fixed upon slide 6 by a second set of set screws 20 which extend through edge portions of table 16 and engage separate stud bolts 21 projecting upwardly from the slide. Stud bolts 21 pass through slots or elongated openings 22 in the table, and rigid clamping of table 16 upon slide 6 is effected by washers and nuts 23. Other set screws 24 extending through a cross rib 25 at the outer end of slide 6 also aid in effecting adjustments and fixing of the table upon said slide and the slide itself may be moved longitudinally in one direction on bed plate 3 by a nut 27 on the screw-threaded end of a shaft 26 attached to the outer end of the slide and passing through a horizontal opening in the end cross piece 28 of bed plate 3, see Figs. 5 and 6. A movement of the slide in the opposite direction may be effected by set screws 29 which extend through cross piece 28 and bear against hardened inset plates 30 within the end of the slide.

The copper clamping and welding dies 14—14' carried by table 16 are made in any desired shape or form conforming to or constructed to grip one of the pieces to be welded. Thus, die or block 14, hereinafter designated as the lower die of this set, is clamped by a plate 31 to one terminal of a solid copper secondary 32 of an electric transformer 33 which is supported in an inclined position within hollow base 2, and this terminal is secured by a cross bolt 34 to an angular projection 35 cast integral with table 16 at its lower right hand corner but it should be understood that table 16 is electrically insulated from bed plate 3.

Transformer 33 is actually provided with two parallel secondaries 32 and 32', respectively, placed side by side around the primary winding and the upper block or die 14' is secured to one terminal of the second secondary 32', and this upper die is supported for vertical movement upon table 16 by means of a cross slide 36 operating in a channeled guide way 37 at the upper right hand corner of table 16. An arm 38 extends rearwardly from table 16 and has a split clamping end 39 adapted to hold a screw-threaded adjusting sleeve 40 wherewith the movement of upper die 14' may be regulated. Thus cross slide 36 to which the terminal of the second secondary 32' is bolted carries a pivoted lever 41 having a short crank arm 42 which is connected by a toggle link 43 to a swivel part 44 within adjusting sleeve 40. By pressing the lever rearwardly the link is buckled and upper die 14' moves apart from lower die 14, and in throwing the lever forwardly the link straightens and brings the dies together and clamps the work therebetween. The upper secondary 32' of the transformer shifts or moves back and forth with die 14'; and adjusting sleeve 40 permits the co-acting dies 14—14' to be placed different distances apart to receive and clamp pieces of different sizes or shapes. The clamping grip of the two dies is not sufficient in itself to resist heavy upsetting pressures in welding two abutting pieces together, and therefore I provide a heavy adjustable backing screw or stop 45 axially in line with the piece of work held between the respective clamping faces of dies 14—14'. Backing screw 45 is supported in a heavy cross bar 46 which is slidably supported at its opposite ends upon a pair of screw-threaded rods 47—47 extending horizontally above table 16 from projection 35 and cross rib 48 forming integral parts of the table. Cross bar 46 may be fixed more or less remotely from the dies by nuts 49 engaged with the screw-threaded rods 47, and backing screw 45 has a lock nut 50 to fix its position after any independent adjustment thereof.

Now reverting to the upsetting slide 5 which is mounted to reciprocate freely on rollers 11, this slide carries the second set of gripping and welding dies 15—15'. These dies are connected separately to the opposite terminals of the two secondaries 32—32' of transformer 33, the terminal of secondary 32 being bolted to an adjustable head 51 at the lower left hand corner of slide 5, and the terminal of the upper secondary 32' being bolted to a cross slide 36' operating in a guide-way 37' at the upper left hand corner of slide 5. Each die 15—15' is detachably secured to a secondary terminal by clamping plates 31', and cross slide 36' is adapted to be operated in the same way as cross slide 36, which carries die 14'. That is to say cross slide 36' carries a pivoted lever 41' having a short crank arm 42' which is connected by a toggle link 43' to a swivel part 44' within a screw sleeve 40' held within the split end 39' of an arm 38' forming an integral part of slide 5. By throwing lever 41' to the rear or forward the two dies 15—15' may be separated or brought together to release or clamp the work, and by rotating screw-sleeve 40' the two dies 15—15' may be set to receive and grip pieces of work of different sizes and to regulate the clamping pressure.

Figures 1, 2, 3:
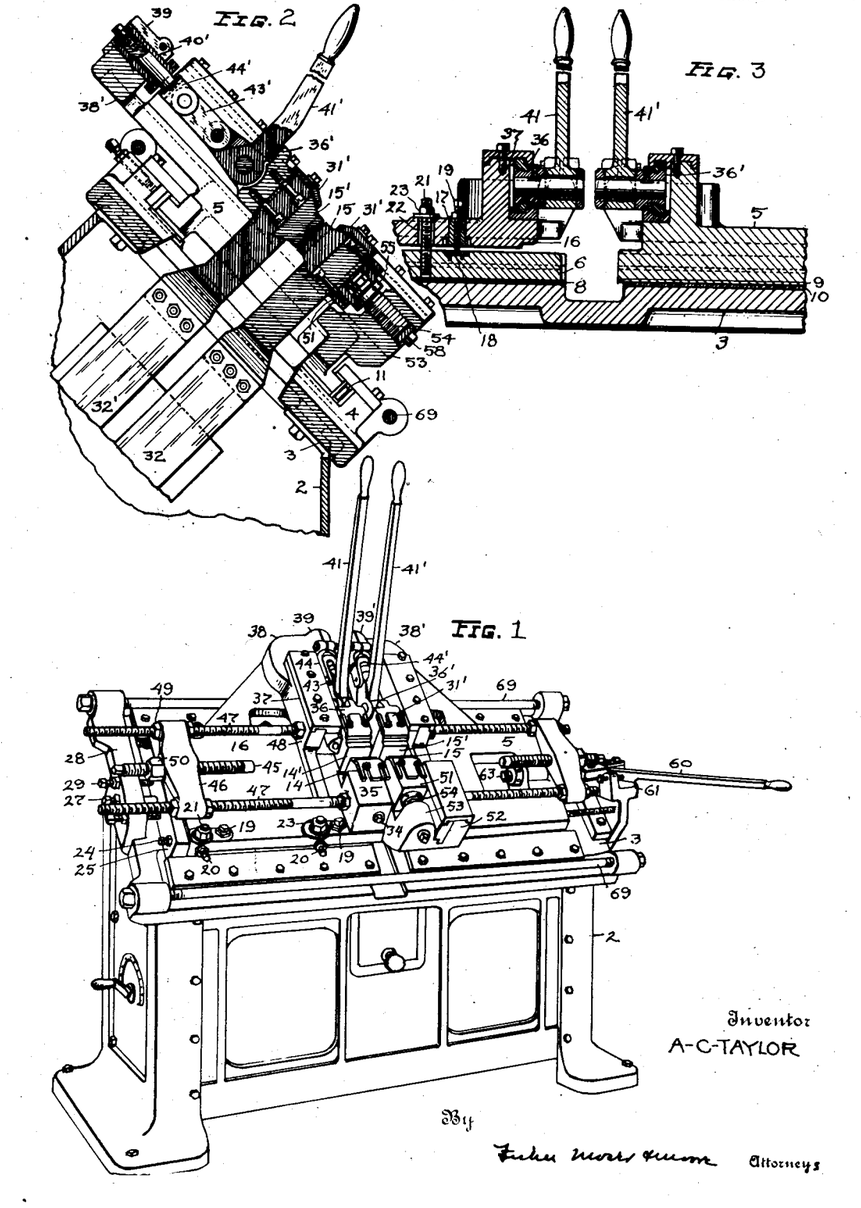
Fig. 1 is a perspective view on a reduced scale of my improved electric butt welding machine.
Fig. 2 is a vertical cross section of the upper part of the machine on line 2—2 of Fig. 5, showing the clamping or welding dies carried by the movable slide.
Fig. 3 is a vertical section longitudinally through a part of the machine of line 3—3 of Fig. 5.
Figure 12:
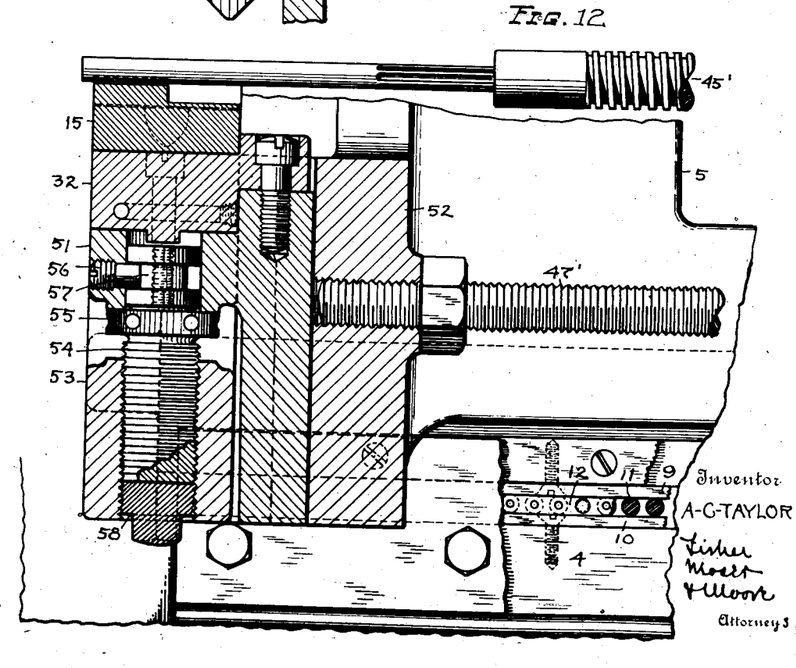
Fig. 12 is an enlarged horizontal section and top view of a part of the movable slide and one of the clamping and welding dies thereon and the backing and adjusting devices for said die.

The pieces or parts to be welded together may require co-axial alignment or be offset, and to permit either abutting relationship to take place the head 51, as well as cross slide 36', is mounted in an adjustable position upon slide 5, see Figs. 2 and 12. Thus, slide 5 is provided with a rib or flange 52 having a guideway at one side thereof for head 51, and an upright lug 53 at the corner of table 5 is adapted to receive a screw 54 having an annular collar 55 in backing engagement and thrust position opposite head 51, see Fig. 12. A set screw 56 in one side of head 51 extends into an annular groove 57 at the inner end of screw 54 to provide a swiveled connection, whereby when screw 54 is rotated to move outwardly the head and die 15 will be caused to move in the same direction. A screw plug 58 may be entered in lug 53 to lock adjusting screw 54 when the parts are all set in a stationary position.

When the pieces to be welded are properly clamped in place and welding is to proceed, the upsetting slide 5 adapted to be reciprocated by means of a lever 60 pivotally mounted upon a bracket 61 bolted to bed plate 3 at one end of the machine. Lever 60 has a short crank arm 61' which is pivotally connected by a single or double toggle link 62 with the outer end of a screw-threaded bolt 63 extending through a centrally located boss 64 at the outer end of slide 5, and nuts 65 on this bolt engage said boss and permit slide 5 and its set of dies 15—15' to be placed at a greater or less working distance from stationary slide 6 and its set of dies 14—14'. Slide 5 is also provided with a central backing screw or adjustable stop 45' for the piece of work held in dies 15—15', and this screw 45' is supported on movable slide 5 in the same way as screw 45 is supported on stationary slide 6. That is, a cross bar 46' is slidably supported upon a pair of screw-threaded rods 47' fixed horizontally above and to slide 5, see Fig. 5.

Figure 4:
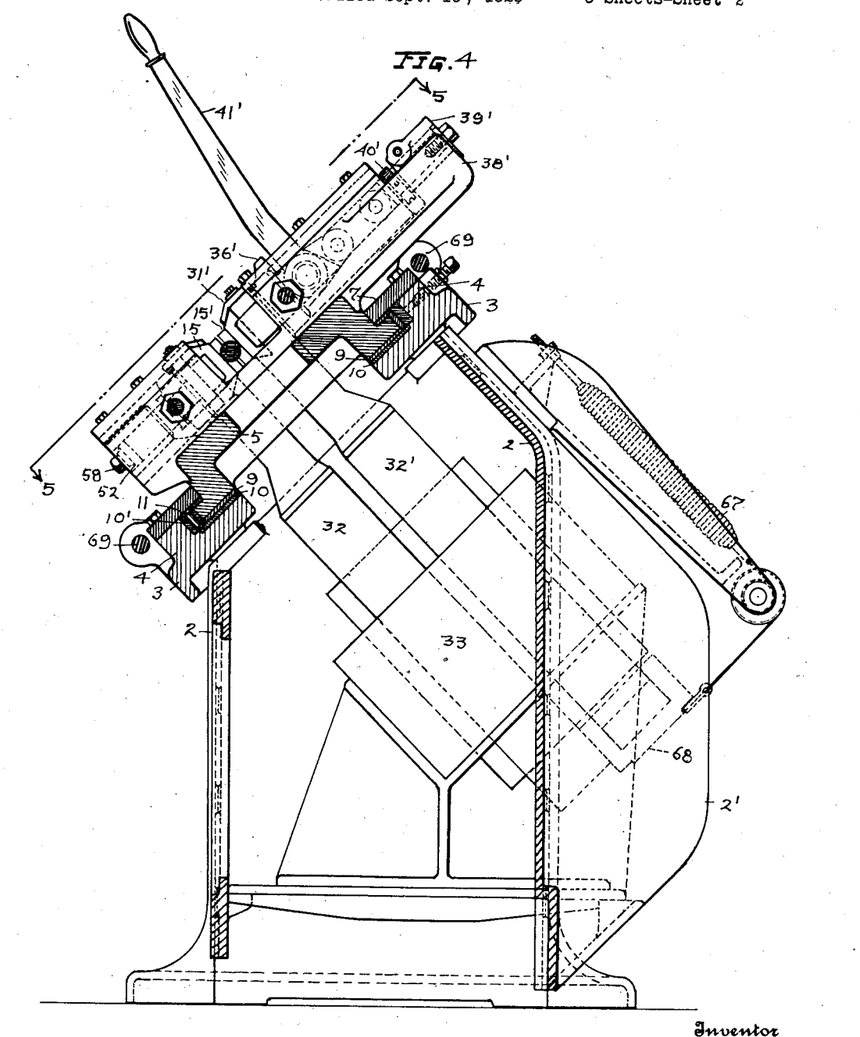
Fig. 4 is a vertical cross section of the machine on line 4—4 of Fig. 5.

Bed plate 3 and both slides 5 and 6 are set at an angle of forty-five degrees to bring the levers 41—41' within convenient reach of the operator, and the work itself is brought into plainer view and made more accessible. Furthermore, the transformer may also be inclined and projected rearwardly into a rear compartment 2' in hollow base 2 and thus placed more remotely in a protected position away from the dies and the flying particles of steel and dropping scale. To facilitate freedom of movement of the moving dies or electrodes 14' and 15' I also prefer to counter-balance the lower end of the heavy secondary 32' by a weight or spring, and for that purpose I show a coiled spring 67 connected by a flexible cord or tape to a yoke 68 attached to secondary 32', see Fig. 4. Both secondaries may be counterpoised in this way or in a similar manner. Bed plate 3 is also preferably re-enforced with heavy tie rods 69 extending longitudinally thereof to prevent the plate from springing and throwing of the work out of alignment when a heavy upsetting pressure is applied. Where heavy pressures are required I may use compressed air to operate slide 5 and the clamping dies. Inasmuch as both of the die operating levers 41—41' and their respective supporting and operating connections are substantially identical, Fig. 2 is a correct showing of both and a duplicate showing in detail is omitted from the drawings. One mode of attaching the respective terminals of the transformer secondaries is also delineated in Fig. 2, and these secondaries are usually heavy loop shaped bands of copper having two terminals rabbeted or grooved at their upper ends to receive wedge-shaped welding dies which are removably clamped thereto by beveled clamping plates 31 and 31' as herein described.

What I regard as my invention or discovery and desire to claim, is:

1. An electric welding machine, comprising a hollow stationary base having a vertically-inclined top, welding dies movable horizontally on said top and an electric transformer connected to said dies and supported in a vertically-inclined and stationary position within said base, said dies being located at the upper end and front of said transformer.

2. An electric welding machine, comprising a set of welding dies mounted in a vertically-inclined position, and an electric transformer having a secondary extending upwardly at an inclination and electrically connected to said dies.

3. An electric welding machine, comprising separate sets of welding dies mounted in a vertically-inclined position, and a single electric transformer having a plural number of secondaries electrically connected with said dies.

4. An electric welding machine, comprising a bed plate and a set of welding dies supported to operate thereon in an inclined plane, and an electric transformer mounted at an inclination beneath said bed plate rearwardly of said dies and electrically connected to said dies.

5. An electric welding machine, comprising a set of welding dies, and an electric transformer having a movable secondary electrically connected to said dies and provided with a counter-balance, said secondary being wholly movable relatively to the primary of said transformer.

6. An electric welding machine, comprising a hollow base, a set of welding dies, and an electric transformer supported in an inclined plane within said base having a secondary movably related to the primary and connected with said dies, and a counter-balancing device connected with the lower end of said secondary.

7. An electric welding machine, comprising a hollow base having an inclined bed-plate at its top, a set of welding dies and operating devices therefor mounted upon said bed plate, and an electric transformer within said hollow base electrically connected with said dies.

8. An electric welding machine, comprising a hollow upright base having a vertically inclined top and a set of vertically-inclined welding dies mounted upon said top, and an electric transformer electrically connected with said dies and supported at an inclination within said hollow base.

9. An electric welding machine, comprising a base having an inclined bed plate at its top, slides mounted upon said bed plate, and a separate set of welding dies and operating devices for said dies mounted upon said slides.

10. An electric welding machine, comprising a base having an inclined top, separate slides mounted upon said top, an adjustable table mounted upon one of said slides, a set of welding dies and operating devices therefor mounted upon said table, and a second set of welding dies and operating devices therefor mounted upon the other slide.

11. An electric welding machine, comprising an upright base having an inclined top, a pair of slides mounted upon said top, means adapted to reciprocate one of said slides, adjusting devices adapted to fix the other slide in a predetermined stationary position, a table adjustably mounted upon said last named slide, separate sets of welding dies having operating devices mounted upon said table and reciprocable slide, and an electric transformer electrically connected with said dies.

12. An electric welding machine, comprising a bed plate having longitudinal guideways, a pair of slides movably seated within said guideways, means adapted to reciprocate one of said slides in its guide way, means adapted to adjustably fix the position of the other slide in its guideway, a table superposed upon said last named slide, means adapted to fix said table in various tilted and shifted positions upon its slide, a set of welding dies operatively mounted upon the reciprocable slide, and an electric transformer electrically connected to said dies.

13. An electric welding machine, comprising a reciprocable slide and an adjustable slide, a set of welding dies operatively mounted upon said reciprocable slide, a table superposed upon said adjustable slide having a second set of welding dies operatively mounted thereon opposite said first set of dies, and adjustable devices and clamping means adapted to permit said table and its dies to be shifted and fixed at different angles upon said adjustable slide relatively to the welding dies upon said reciprocable slide.

14. An electric welding machine, comprising separate sets of welding dies, and a table carrying one set of dies having set screws adapted to raise and lower and tilt the table and its dies relatively to the other set of dies.

15. An electric welding machine, comprising a reciprocable slide and an adjustable slide, separate sets of welding dies mounted opposite one another upon said slides, a slotted table mounted upon said adjustable slide, adjusting screws adapted to tilt and shift said table to different angular positions upon the adjustable slide, and clamping bolts adapted to fix said table in a stationary adjusted position relatively to said reciprocable slide.

16. An electric welding machine, comprising a reciprocable slide and an adjustable slide, an adjustable table superposed upon said adjustable slide, separate sets of welding dies mounted oppositely upon said table and reciprocable slide, and adjustable backing stops mounted upon said table and reciprocable slide for the work clamped within said dies.

17. An electric welding machine, comprising a set of welding dies, and a support for said dies, having a pair of parallel screw-threaded rods extending therefrom and a cross bar adjustably supported upon said rods having an adjustable stop and backing screw for the work within the dies.

18. An electric welding machine, comprising a longitudinally-channeled bed plate, a pair of slides mounted upon said bed plate, separate sets of welding dies mounted upon said slides, means at one end of said bed plate adapted to reciprocate one of said slides, and a set of screw-threaded thrust and pull members at the opposite end of said bed plate adapted to adjust and fix the other slide in a stationary position upon said bed plate relatively to said reciprocable slide.

19. An electric welding machine, comprising separate sets of welding dies oppositely related to hold separate pieces of work in abutting relation, one set of dies having a supporting plate provided with removable bushings and set screws within said bushings adapted to support said plate and dies adjustably in respect to the other set of dies to permit the separate pieces of work to be aligned coaxially or variably related.

20. An electric welding machine, comprising a pair of co-acting welding dies, and operating means for one die and a movable support for the other die having set screws to adjust the dies relatively to one another to permit work of different sizes to be clamped between the dies and steel rest plates for said screws.

21. An electric welding machine, comprising separate sets of dies situated oppositely, each set having one die member thereof provided with an operating device, and one set of dies having a slidable die member adjustably mounted opposite its operating companion member to permit work of different sizes to be clamped therein in abutting relation to the work in the other set of dies and an adjusting screw for said slidable die member.

22. An electric welding machine, comprising separate sets of welding dies, each set of dies having a movable die member and an operating device therefor provided with an adjustable screw connection adapted to vary the clamping engagement with each piece of work, and one die having a swiveled screw adjusting connection adapted to permit adjustment thereof in respect to its movable companion die.

23. An electric welding machine, comprising a set of opposed welding dies adapted to clamp a piece of work, one of said dies having a supporting slide, a lever and toggle link adapted to operate said slide to upset the work, and a swivel and screw connection for said link and slide adapted to adjustably fix the clamping position of one die relatively to the opposite die.

24. An electric welding machine, comprising a transformer terminal and a movable support therefor, a welding die affixed to said terminal, and an adjusting screw in swiveled and thrust connection with said movable support.

25. An electric welding machine, comprising a bed plate having a guide-way faced with hardened steel plates, and a reciprocable slide having a set of welding dies mounted therein and provided with hardened steel plates at its seating places within said guide-way.

26. An electric welding machine, comprising a bed plate having a longitudinal guide-way at one end faced with hardened steel plates and a slide therein faced with hardened steel plates where seated within said guide-way, said bed plate also having a guide way at its opposite end faced with electrical insulating material and seating a second slide, and said respective slides having separate sets of welding dies mounted oppositely thereon.

27. An electric welding machine, comprising a vertically-inclined bed plate having a longitudinal guide-way faced with hardened steel plates, an inclined slide having hardened bearing plates seated within said guide-way, a series of connected rollers within said guide-way supporting the weight of said inclined slide, and a set of welding electrodes mounted upon said slide.

In testimony whereof I affix my signature hereto this 4th day of September, 1923.

ALBERTIS C. TAYLOR.